United States Patent
Schwandt et al.

[11] Patent Number: 6,085,915
[45] Date of Patent: *Jul. 11, 2000

[54] BACK-WASHABLE SPIN-ON OIL FILTER

[75] Inventors: Brian K. Schwandt, Fort Atkinson; Christopher E. Holm, Madison; Brian K. Wagner, Stoughton; Scott W. Schwartz, Waterloo; Barry M. Verdegan, Stoughton; Stephen L. Fallon, Madison, all of Wis.

[73] Assignee: Nelson Industries, Inc., Stoughton, Wis.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/755,479

[22] Filed: Nov. 22, 1996

[51] Int. Cl.[7] .................................................. B01D 29/66
[52] U.S. Cl. ......................... 210/411; 210/438; 210/440; 210/441; 210/455
[58] Field of Search .................... 210/168, 232, 210/438, 440, 443, 444, 450, 456, 493.2, DIG. 17, 457, 458, 411, 455, 441

[56] References Cited

U.S. PATENT DOCUMENTS

| | | |
|---|---|---|
| 1,866,970 | 7/1932 | Garland et al. . |
| 1,901,484 | 3/1933 | Winslow et al. . |
| 1,955,903 | 4/1934 | Cammen . |
| 1,992,339 | 2/1935 | Winslow . |
| 2,919,704 | 1/1960 | Butler . |
| 3,023,906 | 3/1962 | Moore . |
| 3,044,475 | 7/1962 | Thompson . |
| 3,069,015 | 12/1962 | Hultgren et al. . |
| 3,085,688 | 4/1963 | Eberle . |
| 3,093,581 | 6/1963 | Pall et al. ................. 210/444 |
| 3,282,429 | 11/1966 | Wood et al. . |
| 3,319,794 | 5/1967 | Gross . |
| 3,333,703 | 8/1967 | Scavuzzo et al. . |

(List continued on next page.)

FOREIGN PATENT DOCUMENTS

| | | | |
|---|---|---|---|
| 2122 | 1/1910 | United Kingdom | ................... 210/411 |
| 2226254 | 6/1990 | United Kingdom | ................... 210/450 |

*Primary Examiner*—Matthew O. Savage
*Attorney, Agent, or Firm*—Andrus, Sceales, Starke & Sawall

[57] ABSTRACT

A fluid filter assembly (20) includes an axially extending tubular housing shell (24) having an integral closed end (26), a distally opposite integral open end (28), and a sidewall (30) extending integrally between the ends. An annular filter cartridge (32) is in the housing shell. An adapter plate (48) has a first set of threads (50) thread mounting the adapter plate to the machine (22) from which fluid is filtered, and a second set of threads (54) engaging the threads (56) of the open end of the housing shell in thread tightened engagement. The housing shell is a singular one-piece member of sufficient stock and thickness at the open end to be internally threaded and to structurally support direct threaded engagement with the adapter plate without an intermediate structural support member. The housing shell sidewall extending integrally between the ends is of sufficient stock and thickness to prevent torsional crimping thereof upon thread tightened engagement, including when the integral closed end of the housing shell is gripped and turned to turn the housing shell at the integral open end into direct threaded engagement with the adapter plate. In addition to simplified reduced part content, easy change of the filter cartridge is also enabled, wherein the adapter plate remains on the machine when the housing shell is removed.

1 Claim, 8 Drawing Sheets

U.S. PATENT DOCUMENTS

| | | |
|---|---|---|
| 3,490,594 | 1/1970 | Hutchins, Jr. . |
| 3,773,180 | 11/1973 | Harrison . |
| 3,855,127 | 12/1974 | Nakajima ................................. 210/456 |
| 3,867,294 | 2/1975 | Pall et al. . |
| 3,887,467 | 6/1975 | Johnson . |
| 4,322,299 | 3/1982 | Scholten et al. . |
| 4,369,113 | 1/1983 | Stifelman . |
| 4,492,632 | 1/1985 | Mattson . |
| 4,643,836 | 2/1987 | Schmid . |
| 4,720,292 | 1/1988 | Engel et al. . |
| 4,743,374 | 5/1988 | Stifelman ................................. 210/440 |
| 4,834,885 | 5/1989 | Misgen et al. . |
| 4,859,330 | 8/1989 | Pauwels . |
| 4,969,994 | 11/1990 | Misgen et al. . |
| 5,039,406 | 8/1991 | Whittington . |
| 5,062,398 | 11/1991 | Bedi et al. . |
| 5,066,391 | 11/1991 | Faria . |
| 5,104,537 | 4/1992 | Stifelman et al. . |
| 5,118,417 | 6/1992 | Deibel . |
| 5,145,033 | 9/1992 | Bedi et al. . |
| 5,160,614 | 11/1992 | Brown . |
| 5,259,953 | 11/1993 | Baracchi et al. . |
| 5,342,519 | 8/1994 | Friedmann et al. . |
| 5,374,355 | 12/1994 | Habiger et al. ......................... 210/450 |
| 5,462,679 | 10/1995 | Verrdegan et al. . |
| 5,525,226 | 6/1996 | Brown et al. ........................... 210/443 |
| 5,556,542 | 9/1996 | Berman et al. ......................... 210/440 |
| 5,584,987 | 12/1996 | Mules ...................................... 210/440 |
| 5,711,872 | 1/1998 | Jones et al. ............................. 210/443 |

FIG. 1
FIG. 2
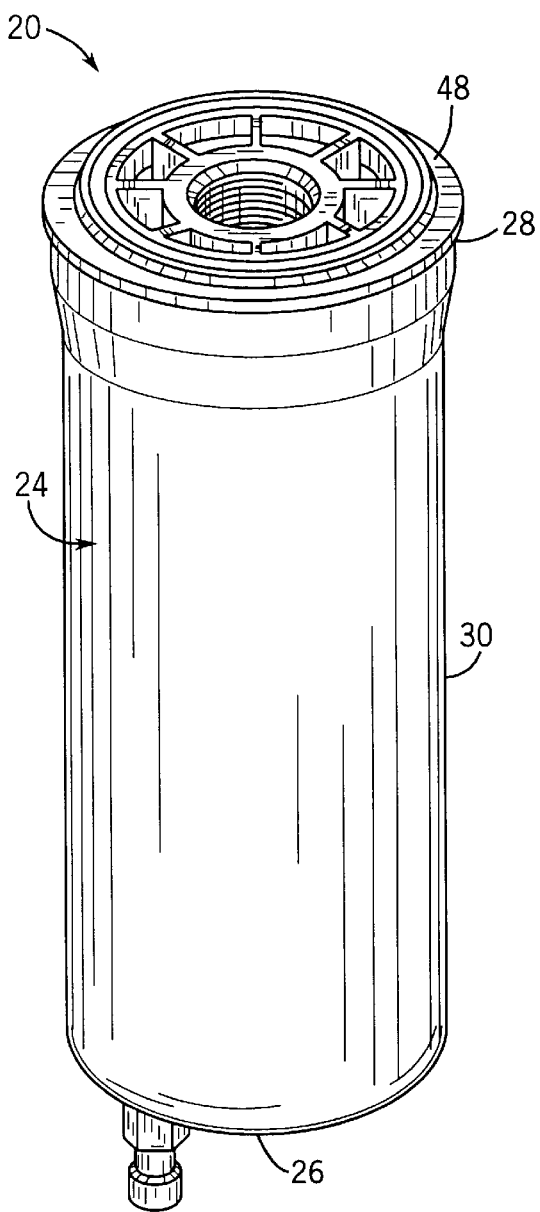
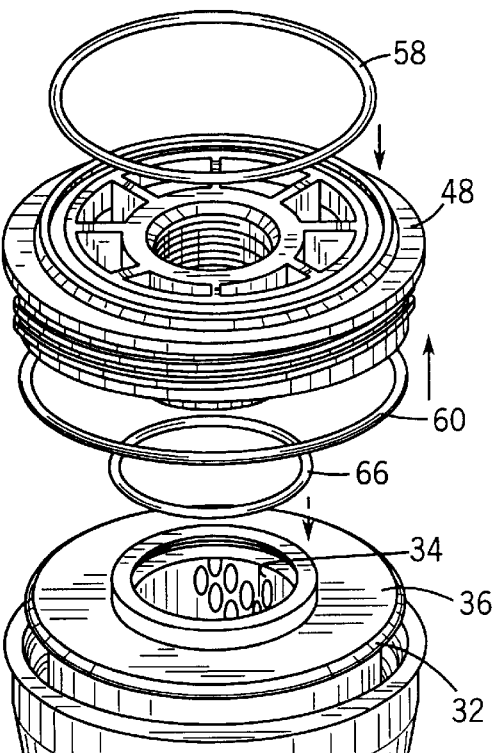
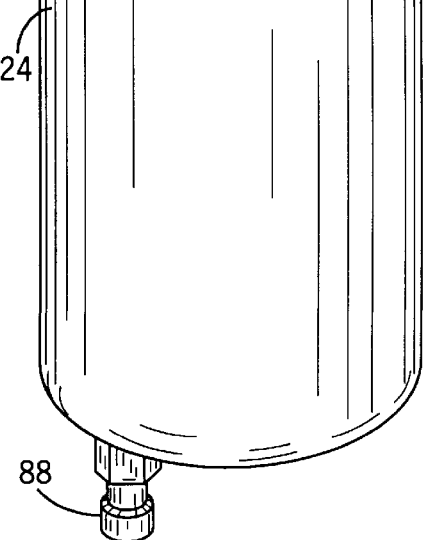

6,085,915

BACK-WASHABLE SPIN-ON OIL FILTER

BACKGROUND AND SUMMARY

The invention relates to fluid filter assemblies, including spin-on type oil filters and the like, and more particularly to a simplified reduced part content easy change assembly.

The invention arose during continuing development efforts directed toward fluid filter assemblies of the reusable type. In these types of assemblies, it is desired to reuse as many component parts of the assembly as possible following each fluid change interval, such as an engine oil change. It is preferred to discard only the filter cartridge.

The present invention provides a simplified reduced part content fluid filter assembly of the above type, including simplified and effective housing shell structure and adapter plate structure, and eliminates numerous previous components in prior high part content assemblies.

In a desired implementation, the present invention may be used in combination with cleanable fluid filter assemblies as shown in commonly owned co-pending U.S. application Ser. No. 08/755,497 Attorney Docket 2527-00125, filed on even date herewith, and in commonly owned U.S. Pat. No. 5,462,679, incorporated herein by reference. In the present invention in combination, the filter cartridge may be cleaned in-situ without disassembling the filter assembly nor removing same from the engine or machine. Such cleansing structure is provided in combination with the simplified easy change structure of the present invention. When the filter cartridge becomes no longer cleanable or it is otherwise desired to change the filter cartridge and replace it with a new one, the change is quick and easy.

BRIEF DESCRIPTION OF THE DRAWINGS

FIG. 1 is a perspective assembled view of a fluid filter assembly in accordance with the invention.

FIG. 2 is an exploded perspective view of the structure of FIG. 1.

DETAILED DESCRIPTION

Figure 3:
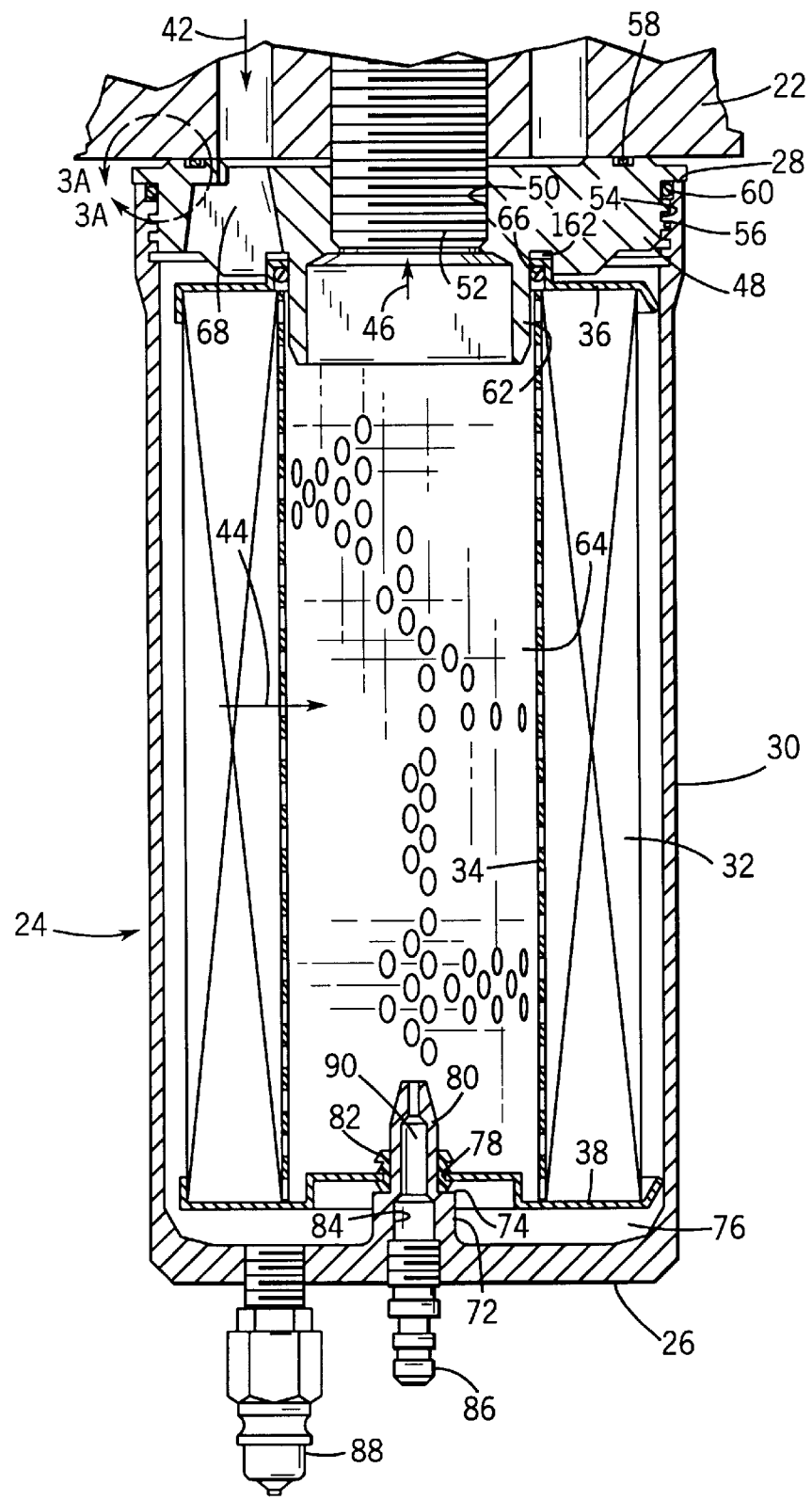
FIG. 3 is a sectional view of a fluid filter assembly in accordance with the invention.
Figure 10:
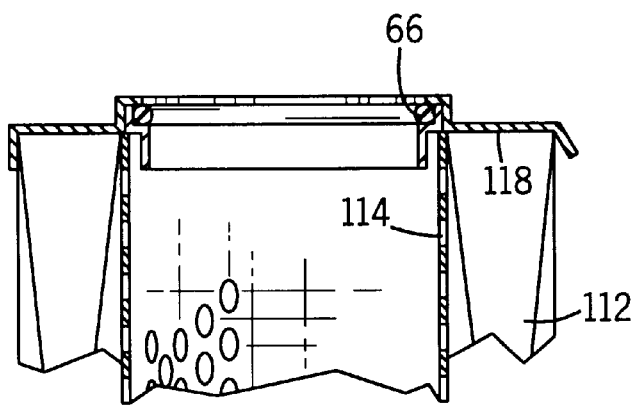
FIG. 10 is a view of a portion of the structure of FIG. 9.
Figure 14:
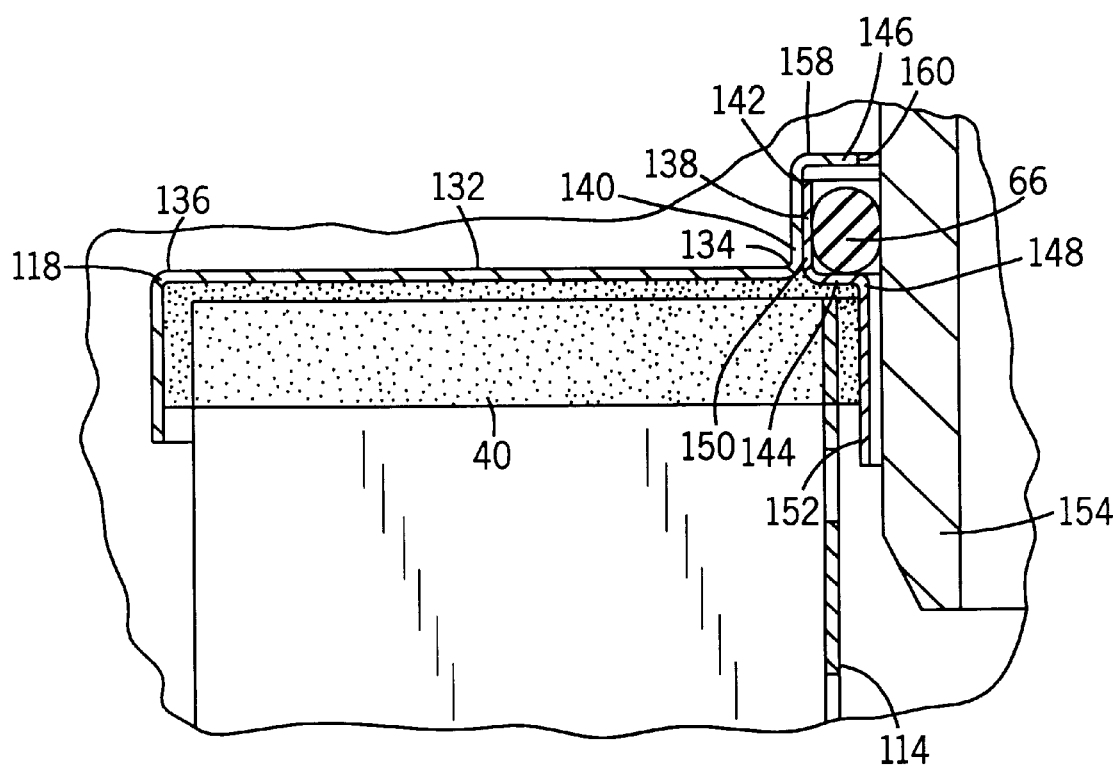
FIG. 14 is an enlarged view of a portion of the structure of FIG. 9.

FIGS. 1 and 2 show a fluid filter assembly 20 for filtering fluid from a machine, such as an internal combustion engine for example as shown at engine block 22, FIG. 3. The fluid filter assembly includes an axially extending tubular metal housing shell 24 having an integral closed end 26, a distally opposite integral open end 28, and a sidewall 30 extending integrally between the ends. An annular filter cartridge 32 in housing shell 24 filters fluid from machine 22. Filter cartridge 32 is formed of pleats of filter media material formed in an annulus concentrically around a perforated inner metal cylinder or tube 34 and supported and closed at their ends by end plates 36 and 38, typically by adhesive material such as 40, FIG. 14, all as is standard and known in the prior art. Fluid flows from machine 22 as shown at arrow 42, FIG. 3, into housing shell 24 and then radially inwardly as shown at arrow 44 through filter cartridge 32 and then axially outwardly as shown at arrow 46 back to machine 22, as is standard. An adapter plate 48 has a first set of threads 50 mounting the adapter plate to machine 22, for example to threaded male stud 52 extending from the machine axially into the filter assembly. Adapter plate 48 has a second set of threads 54 engaging threads 56 of integral open end 28 of housing shell 24 in thread tightened engagement.

Housing shell 24 is a singular one-piece member of sufficient stock and thickness at open end 28 to be internally threaded at 56 and to structurally support direct threaded engagement with adapter plate 48 at threads 54 without an intermediate structural support member. This is not possible in previous thin walled housing shell constructions. Housing shell sidewall 30 extending integrally between ends 26 and 28 is of sufficient stock and thickness to prevent torsional crimping thereof upon the noted thread tightened engagement. That is, when integral closed end 26 of the housing shell is gripped and turned to turn the housing shell at integral open end 28 into direct threaded engagement with adapter plate 48, there is no torsional crimping of sidewall 30.

Housing shell 24 has integral stock thickness sections of different thicknesses. The radial integral stock thickness of open end 28 is greater than the radial integral stock thickness of sidewall 30. The axial integral stock thickness of closed end 26 is greater than the radial integral stock thickness of sidewall 30.

Figure 6:
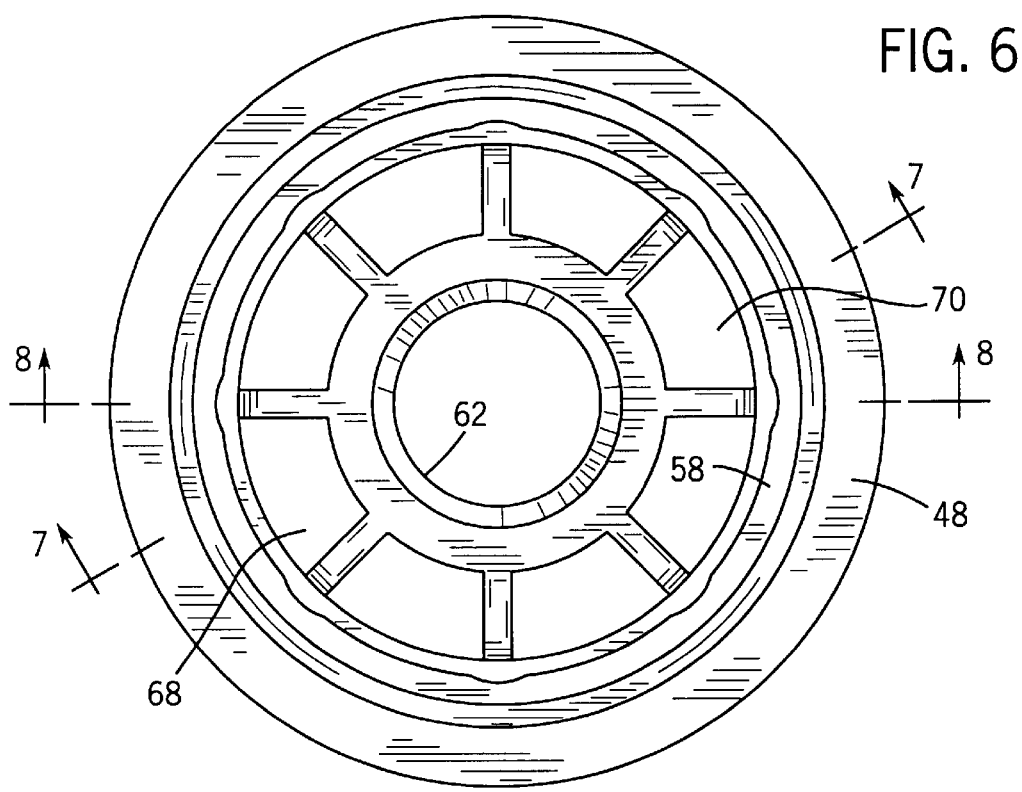
FIG. 6 is a top view of a portion of the structure of FIG. 2.
Figure 7:
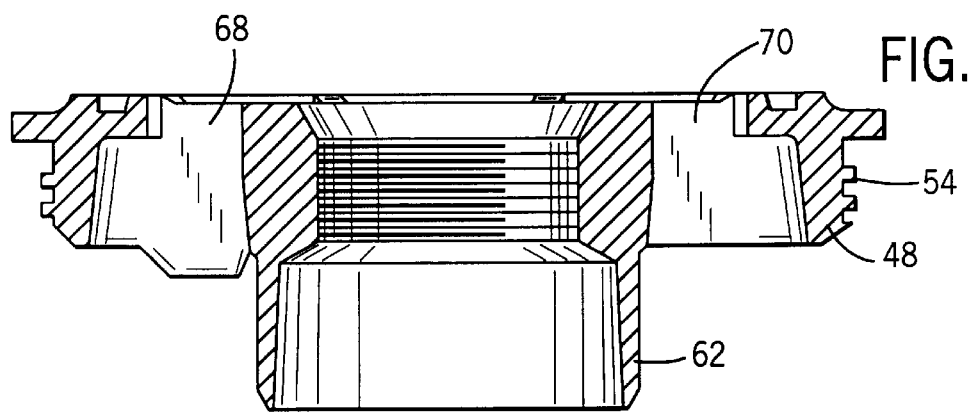
FIG. 7 is a sectional view taken along line 7—7 of FIG. 6.
Figure 8:
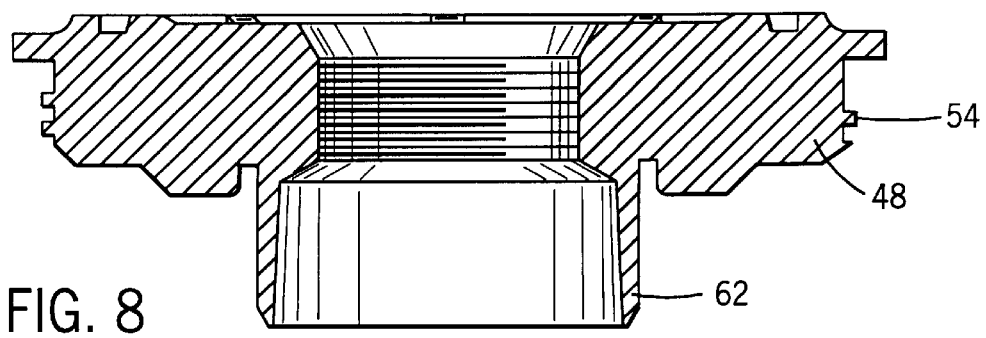
FIG. 8 is a sectional view taken along line 8—8 of FIG. 6.

When adapter plate 48 is thread tightened onto stud 52, annular resilient O-ring 58 is axially compressed in sealing relation between adapter plate 48 and machine 22. When housing shell 24 is thread tightened onto adapter plate 48, resilient annular O-ring 60 is axially and radially compressed in sealing relation between housing shell 24 and adapter plate 48. Adapter plate 48 includes a central tubular outlet 62 extending into hollow interior 64 of filter cartridge 32. When filter cartridge 32 is inserted onto central outlet 62 of adaptor plate 48, O-ring 66 is radially compressed in sealing relation between end plate 36 and the outer cylindrical surface of outlet 62. Adapter plate 48 has a plurality of inlets 68, 70, etc., FIG. 6, circumferentially spaced around outlet 62 and admitting fluid from machine 22 as shown at 42. Integral closed end 26 of housing shell 24 has a central inner integral boss 72, FIG. 3, extending axially into the housing shell and supporting and locating filter cartridge 32. Integral boss 72 has an annular shoulder 74 facing axially into housing shell 24 and spacing filter cartridge 32 axially from integral closed end 26 to form an axial gap 76 therebetween. End cap 38 has a central aperture 78 therethrough. Integral boss 72 includes a central axial extension portion 80 extending axially from annular shoulder 74 through aperture 78. A resilient annular sealing member provided by grommet 82 in aperture 78 concentrically surrounds central axial extension 80 of integral boss 72 and is radially engaged between end plate 38 and central axial extension 80 and is axially engaged between end plate 38 and annular shoulder 74 in sealing relation.

Integral boss 72 has an axially extending passage 84 therein communicating with hollow interior 64 of filter cartridge 32. A first externally accessible fitting 86 is mounted in threaded relation to integral closed end 26 of the housing shell and communicates with passage 84 in boss 72 for introducing cleansing fluid to backwash filter cartridge 32, in accordance with the above noted commonly owned co-pending application. In one desirable combination, the cleansing fluid is pressurized air in accordance with commonly owned U.S. Pat. No. 5,462,679, incorporated herein by reference. A second externally accessible fitting 88 is thread mounted to housing shell 24 for exhausting the noted cleansing fluid such as air and for draining backwashed fluid from filter cartridge 32, as in the noted co-pending application and the '679 patent. In a further desirable combination and in accordance with the noted co-pending application, a second filter cartridge 90 may be provided in passage 84 for filtering the cleansing fluid such as air.

Figure 9:
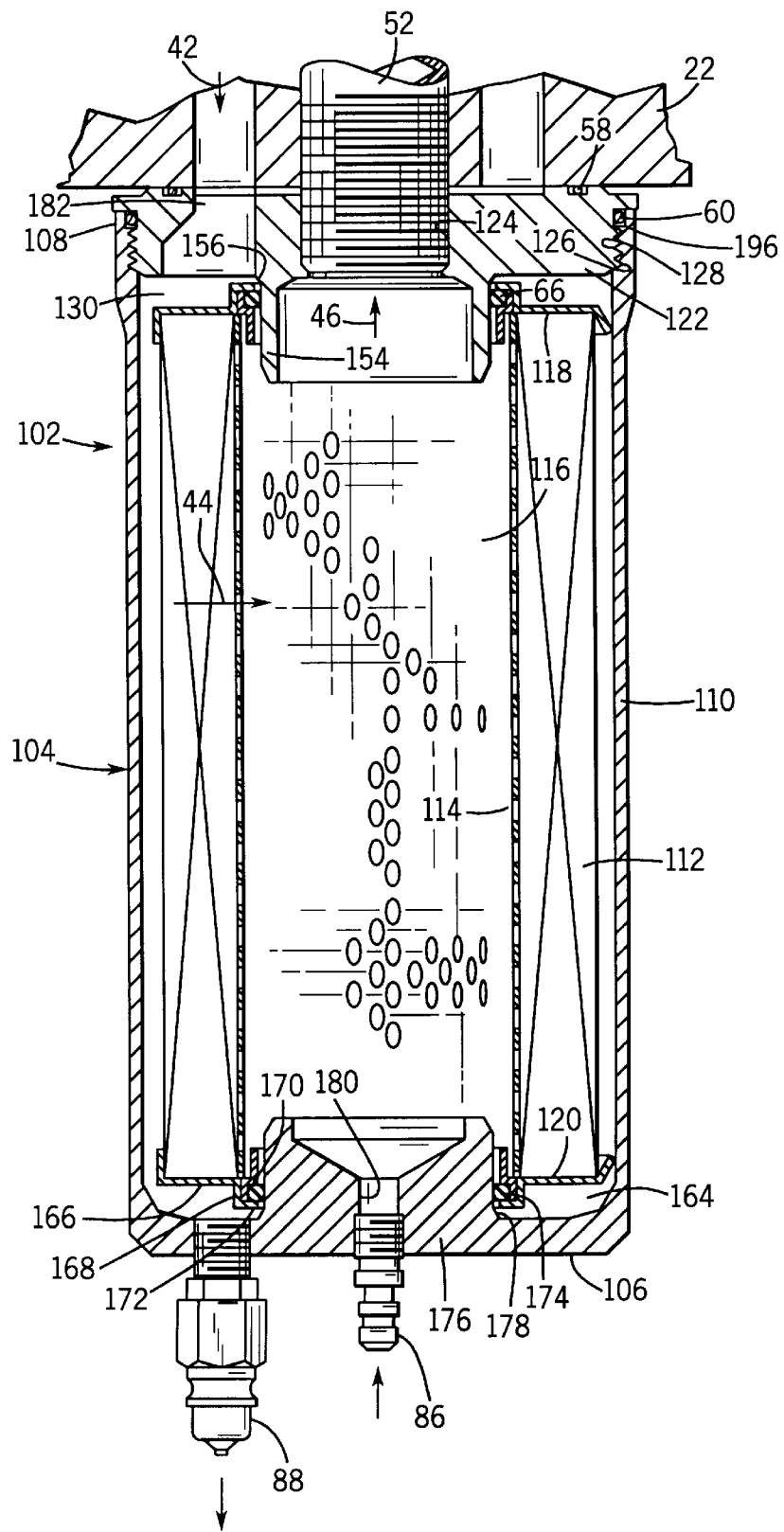
FIG. 9 is a sectional view showing a further embodiment of a fluid filter assembly in accordance with the invention.

FIG. 9 shows a further embodiment and uses like reference numerals from above where appropriate to facilitate understanding. Fluid filter assembly 102 includes an axially extending metal tubular housing shell 104 having an integral closed end 106, a distally opposite integral open end 108, and a sidewall 110 extending integrally between the ends. An annular filter cartridge 112 in housing shell 104 is formed by a plurality of pleats of filter media material formed in an annulus about inner perforated tubular metal shell 114 having central open or void space 116. The ends of the pleats are dipped in adhesive such as 40, FIG. 14, and adhesively secured to and covered by respective end plates 118 and 120. Adapter plate 122 has a first set of threads 124 thread mounting the adapter plate to the machine at threaded male stud 52. Adapter plate 122 has a second set of threads 126 engaging threads 128 of open end 108 of the housing shell in thread tightened engagement, as above.

End plate 118 at the axial end of filter cartridge 112 axially faces adapter plate 122 across axial gap 130. End plate 118 has a first annular surface 132, FIG. 14, extending radially between inner and outer circumferences 134 and 136, respectively. End plate 118 has a cylindrical surface 138 having a first axial end 140 at inner circumference 134 and extending axially toward adapter plate 122 to a second axial end 142. End plate 118 has a second annular surface 144 extending radially inwardly from first end 140 of cylindrical surface 138. End plate 118 has a third annular surface 146 extending radially inwardly from second end 142 of cylindrical surface 138. In preferred form, surface 144 is provided by a retainer member 148 having an axially extending section 150 welded to the axially extending section of the end cap to provide in combination cylindrical surface 138, and having a radially extending section providing surface 144, and having another axially extending section 152 radially spaced between inner wall 114 of filter cartridge 112 and central tubular outlet 154 of adapter plate 122. A resilient annular sealing member is provided by O-ring 66 between second and third annular surfaces 144 and 146. The central outer cylindrical surface provided by adapter plate outlet 154 extends axially into the filter cartridge into central open or void space 116 and engages O-ring 66 in sealing relation and radially compresses the latter against cylindrical surface 138.

Adapter plate 122, FIG. 9, includes a stop surface 156 extending generally radially outwardly away from cylindrical surface 154 and limiting axial movement of end plate 118 toward adapter plate 122 to prevent pinching or crimping of O-ring 66. In the preferred embodiment, stop surface 156 is a beveled surface extending radially outwardly from cylindrical surface 154 and axially toward machine 22 and limiting axial movement of third annular surface 146, FIG. 14, toward the adapter plate. Third annular surface 146 has an outer circumference 158 at the second end 142 of cylindrical surface 138 and extends radially inwardly to an inner circumference 160. Beveled surface 156, FIG. 9, limits axial movement of inner circumference 160 of third annular surface 146 toward the adapter plate. In another embodiment, FIG. 3, retainer member 148 is deleted, and the noted second annular surface 144 is instead provided by the axial ends of the pleats of filter cartridge 32 and the axial end of inner sidewall 34. Also in FIG. 3, the stop surface of adapter plate 48 is provided by an annular groove 162 in the adapter plate receiving the noted third annular surface 146 and the noted cylindrical surface 138 of the end plate therein to limit the noted axial movement of the end plate to prevent pinching or crimping of O-ring 66.

In FIG. 9, filter cartridge 112 is open at both ends, and end plates 118 and 120 are identical. Since end plate 120 is identical to above described end plate 118, it will be only briefly described. End plate 120 axially faces integral closed end 106 of housing shell 104 across axial gap 164 therebetween. End plate 120 has a first annular surface 166 extending radially between inner and outer circumferences. End plate 120 has a cylindrical surface 168 having a first axial end at the inner circumference of first annular surface 166 and extending axially toward integral closed end 106 of the housing shell to a second axial end. End plate 120 has a second annular surface 170 extending radially inwardly from the noted first end of cylindrical surface 168. End plate 120 has a third annular surface 172 extending radially inwardly from the noted second end of cylindrical surface 168. A resilient annular sealing member is provided by O-ring 174 between second and third annular surfaces 170 and 172. Integral closed end 106 of the housing shell has a central integral boss 176 extending axially into the housing shell and into filter cartridge 112 into open space 116 and provides a central cylindrical surface extending axially into filter cartridge 112 and engaging O-ring 174 in sealing relation and radially compressing the latter against cylindrical surface 168. Integral closed end 106 of the housing shell includes a stop surface 178 extending generally radially away from the cylindrical surface provided by boss 176 and limiting axial movement of end plate 120 toward closed end 106 to prevent pinching or crimping of O-ring 174. In preferred form, stop surface 178 is a beveled surface extending radially outwardly from the cylindrical surface of boss 176 and axially away from machine 22 and limiting axial movement of third annular surface 172 at its inner circumference.

Integral boss 176, FIG. 9, has a central axially extending passage 180, comparable to passage 84, FIG. 3, for supplying cleansing fluid such as pressurized air from fitting 86 to the interior 116 of filter cartridge 112 for backflushing the latter. Drain fitting 88 is provided as above for exhausting the cleansing fluid and draining backwashed fluid. A second filter may be provided in passage 180 comparable to filter 90 for filtering the cleansing fluid.

Figure 11:
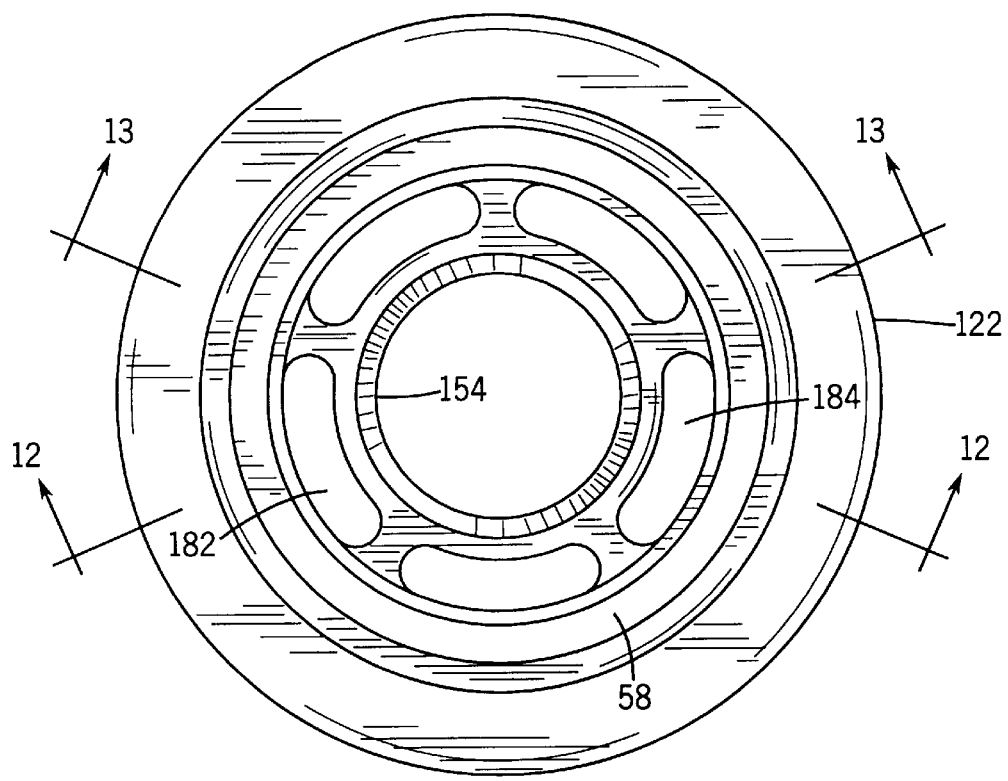
FIG. 11 is a top view of a portion of the structure of FIG. 9.
Figure 12:
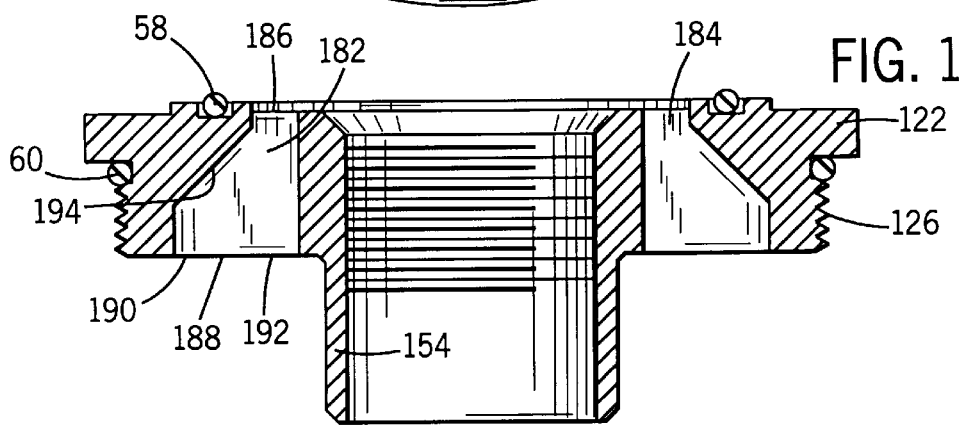
FIG. 12 is a sectional view taken along line 12—12 of FIG. 11.
Figure 13:
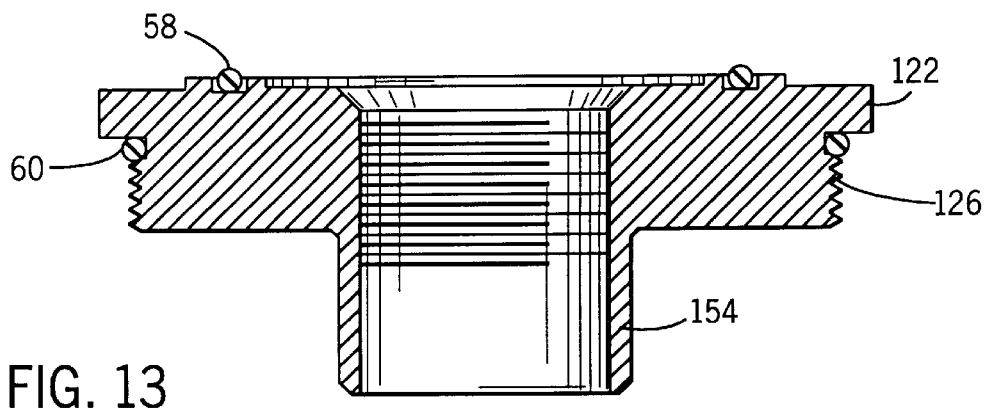
FIG. 13 is a sectional view taken along line 13—13 of FIG. 11.

Adapter plate 122, FIG. 9, includes the noted central outlet 154 communicating with the interior 116 of filter cartridge 112. Adapter plate 122 has a plurality of inlets 182, 184, etc., FIGS. 11 and 12, circumferentially spaced around outlet 154. Each inlet extends axially through adapter plate 122 between a first opening 186, FIG. 12, facing machine 122, and a second opening 188 facing into housing shell 104. Second opening 188 has a first portion 190 axially offset and misaligned from first opening 186. Second opening 188 has a second portion 192 axially aligned with first opening 186. Adapter plate 122 has an inner beveled sidewall 194 extending axially and radially away from first opening 186 to first portion 190 of second opening 188. First portion 190 of second opening 188 is radially outward of second portion 192. Inner beveled sidewall 194 extends from first opening 186 axially toward and radially outwardly to first portion 190 of second opening 188, reducing pressure drop and flow restriction. First opening 186 lies in a first lateral plane perpendicular to the noted direction of axial extension 46. Second opening 188 lies in a second lateral plane perpendicular to the noted direction of axial extension. The area of second opening 188 in the noted second lateral plane is greater than the area of first opening 186 in the noted first lateral plane.

In FIG. 9, first annular O-ring 58 is axially compressed in sealing relation between adapter plate 122 and machine 22. Second annular O-ring 60 is axially and radially compressed in sealing relation between adapter plate 122 and housing shell 104 at integral open end 108, preferably along beveled surface 196. Third annular O-ring 66 is radially compressed in sealing relation between adapter plate 122 at central cylindrical surface outlet 154 and filter cartridge 112 at cylindrical surface 138 of end plate 118. Fourth annular O-ring 174 is radially compressed in sealing relation between housing shell 104 at the cylindrical surface provided by boss 176 extending integrally from closed end 106 and filter cartridge 112 at the cylindrical surface 168 of end cap 120. Integral boss 176 and central outlet 154 extend axially toward end other and have substantially the same outer circumference. The opposite axial ends of filter cartridge 112 preferably are substantially identical such that either end may be mounted to either of integral boss 176 and outlet 154 of adapter plate 122. Third and fourth O-rings 66 and 174 have the same diameter. O-ring 58 has a greater diameter than O-rings 66 and 174. O-ring 60 has a greater diameter than O-ring 58. O-ring 60 is spaced axially away from and radially outwardly of O-ring 58. O-ring 66 is spaced axially away from and radially inwardly of O-ring 60 and on the opposite axial side thereof from O-ring 58. O-ring 174 is spaced axially from and is axially aligned with O-ring 66 and on the opposite axial side thereof from O-ring 60.

Figure 3A:
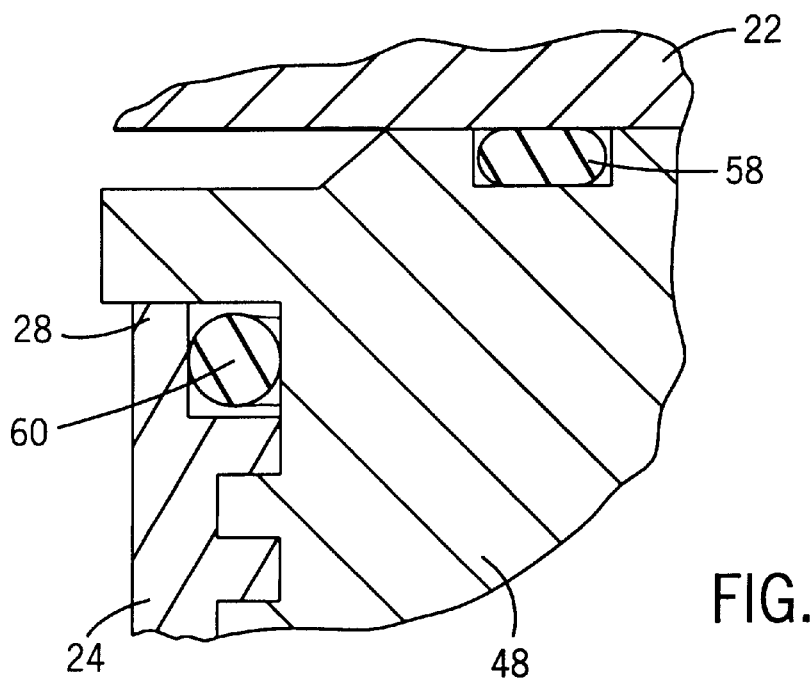
FIG. 3a is a sectional view taken along line 3a—3a of FIG. 3.
Figure 4:
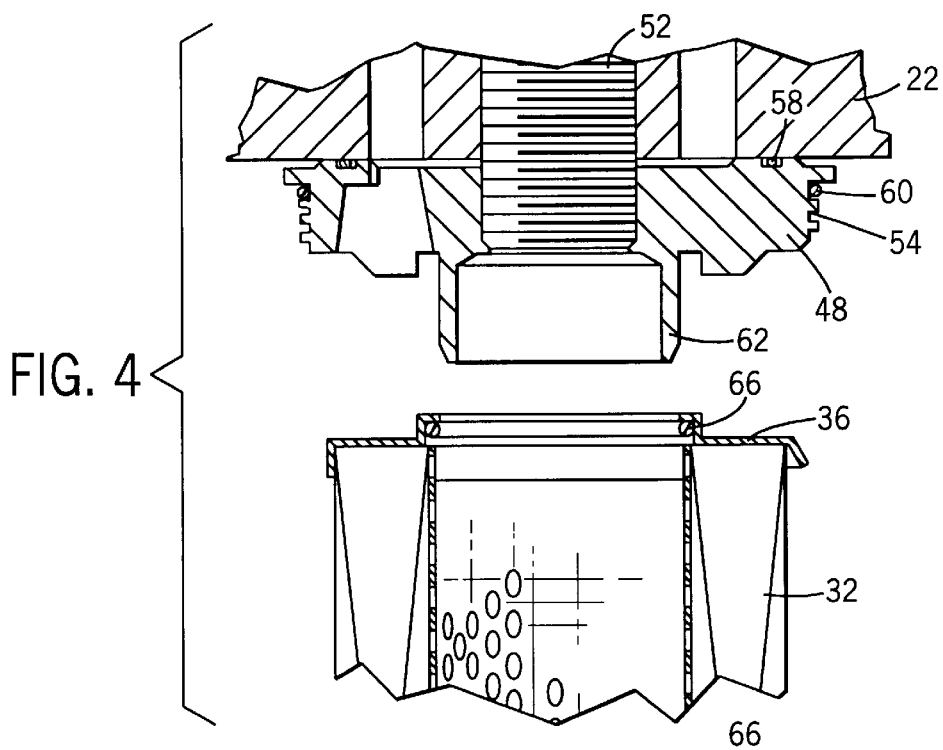
FIG. 4 is an exploded view of a portion of the structure of FIG. 3.
Figure 5:
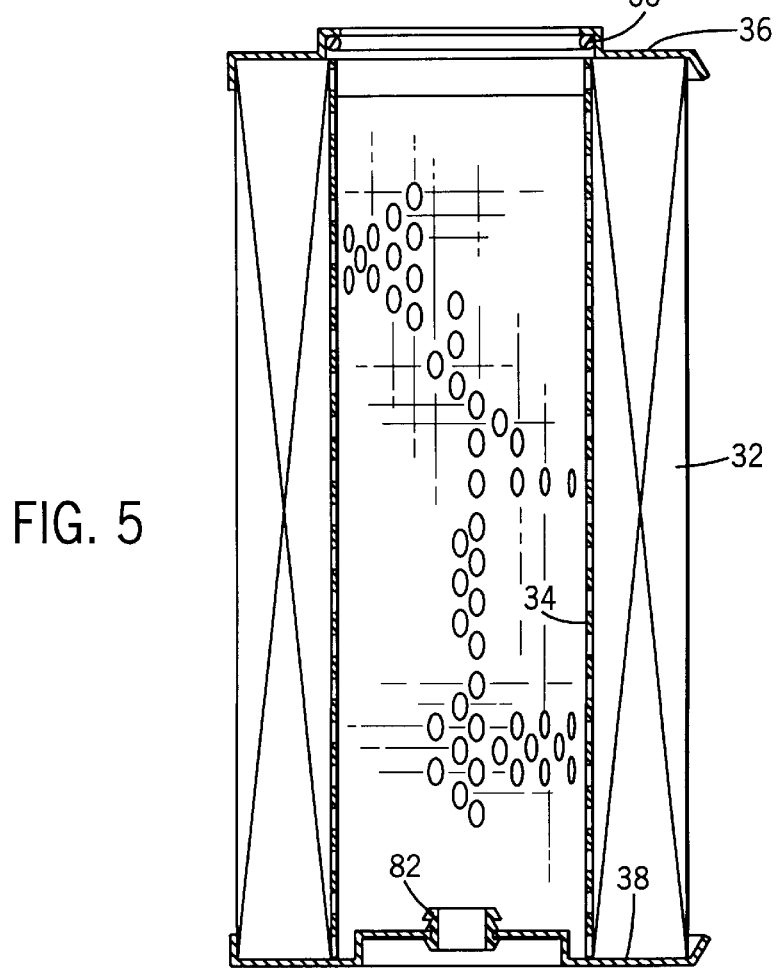
FIG. 5 is a view of a portion of the structure of FIG. 3.

The present invention provides a method for easily changing the filter cartridge in the fluid filter assembly. This is accomplished, FIG. 3, by removing housing shell 24 from adapter plate 48 without removing adapter plate 48 from machine 22. This is accomplished by initially installing the filter assembly in assembled condition on machine 22 with differential force gradients between adapter plate 48 and machine 22 and between housing shell 24 and adapter plate 48. Adapter plate 48 is thread tightened to machine 22 with a first force gradient therebetween. Housing shell 24 is thread tightened to adapter plate 48 with a second force gradient therebetween less than the noted first force gradient. The noted force gradients are provided by differential compression of resilient seals 58 and 60, FIG. 3a. The axial compression of O-ring 58 is greater than the combined axial and radial compression of O-ring 60. In an alternate embodiment, the noted differential force gradient engagement is provided by resilient seals of different durometer.

In one embodiment in combination with the noted co-pending application, the filter assembly is cleaned by supplying cleansing fluid such as pressurized air to fitting 86 to backwash filter cartridge 32 prior to removal of housing shell 24 from adapter plate 48.

During removal of housing shell 24 from adapter plate 48, filter cartridge 32 may be left on outlet 62 of the adapter plate, and then removed from the adapter plate after housing shell 24 has been removed. Alternatively, during removal of housing shell 24 from adapter plate 48, the axial end of filter cartridge 32 at end plate 36 may be manually engaged by the service technician at open end 28 of the housing shell and axially urged toward closed end 26 of the housing shell such that filter cartridge 32 remains in housing shell 24 upon removal of the latter from adapter plate 48. Filter cartridge 32 is then removed from housing shell 24.

It is recognized that various equivalents, alternatives and modifications are possible within the scope of the append claims.

What is claimed is:

1. A fluid filter assembly for filtering fluid from a machine comprising:

an axially extending tubular housing shell having an integral closed end, a distally opposite integral open end having threads, and a sidewall extending integrally between said ends;

an annular filter cartridge in said housing shell;

an adapter plate having a first set of threads mounting said adapter plate to said machine, and a second set of threads engaging said threads of said open end of said housing shell in thread tightened engagement, said adapter plate having an inlet for receiving fluid from said machine and directing said fluid through said filter cartridge, and an outlet for receiving filtered fluid from said filter cartridge and directing said filtered fluid back to said machine, wherein said integral closed end of said housing shell comprises a central inner integral boss extending axially into said housing shell and supporting and locating said filter cartridge therein, wherein said integral boss has an axially extending passage therein, and comprising a first externally accessible fitting mounted to said integral closed end of said housing shell and communicating with said passage in said boss for introducing cleansing fluid to backwash said filter cartridge, and comprising a second externally accessible fitting mounted to said housing shell for exhausting said cleansing fluid after it has passed through said filter cartridge and draining backwashed fluid from said filter cartridge, and comprising second filter cartridge in said passage in said boss for filtering said cleansing fluid.

* * * * *